Figure 1:
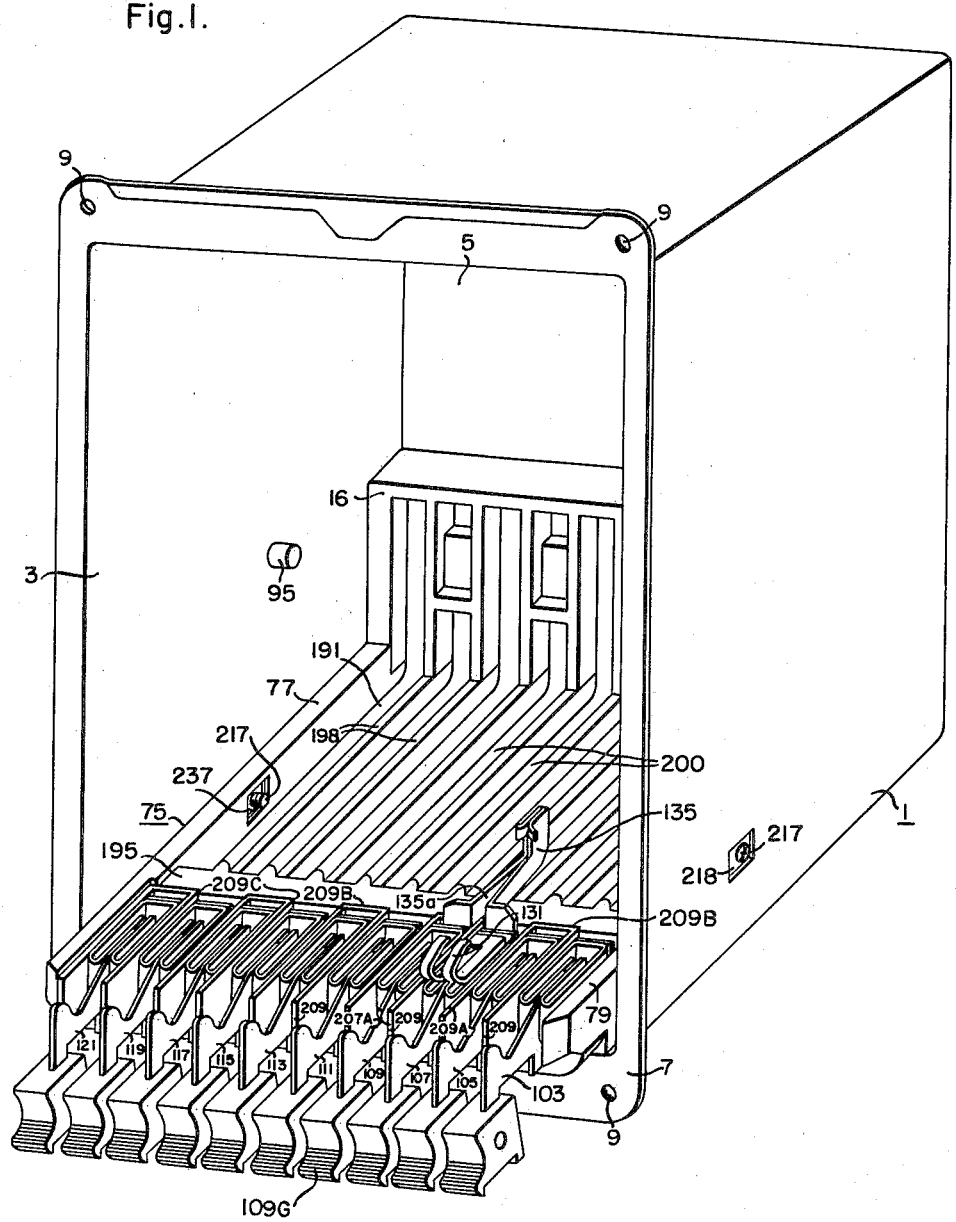

Jan. 31, 1961  K. RIESZ ET AL  2,970,243
ELECTRICAL INSTRUMENT MOUNTING
Filed July 30, 1957  5 Sheets-Sheet 3
Fig.3.
Fig.3A.
Fig.4.
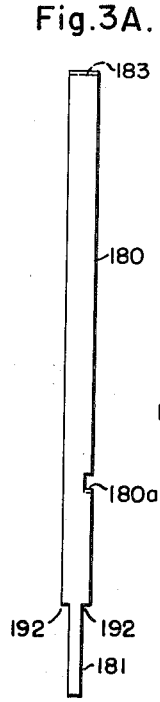
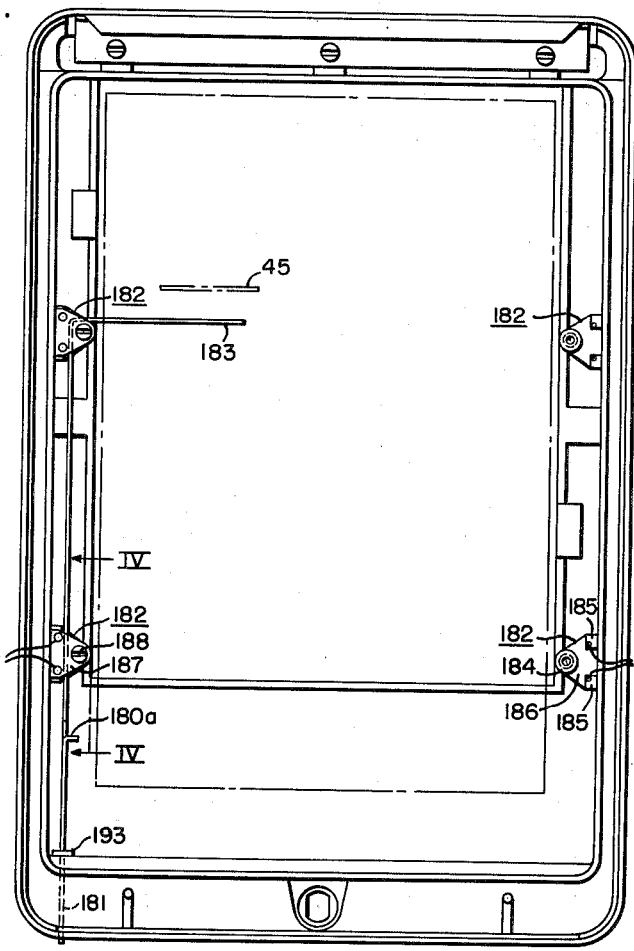
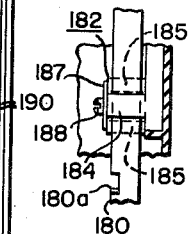
Fig.5.
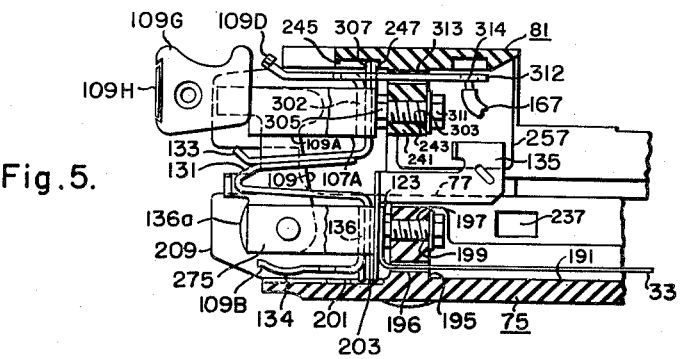

Jan. 31, 1961

K. RIESZ ET AL 2,970,243

ELECTRICAL INSTRUMENT MOUNTING

Filed July 30, 1957

5 Sheets-Sheet 4

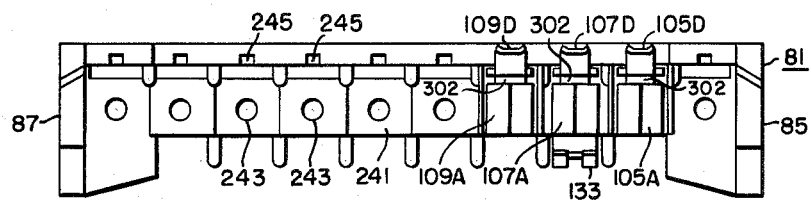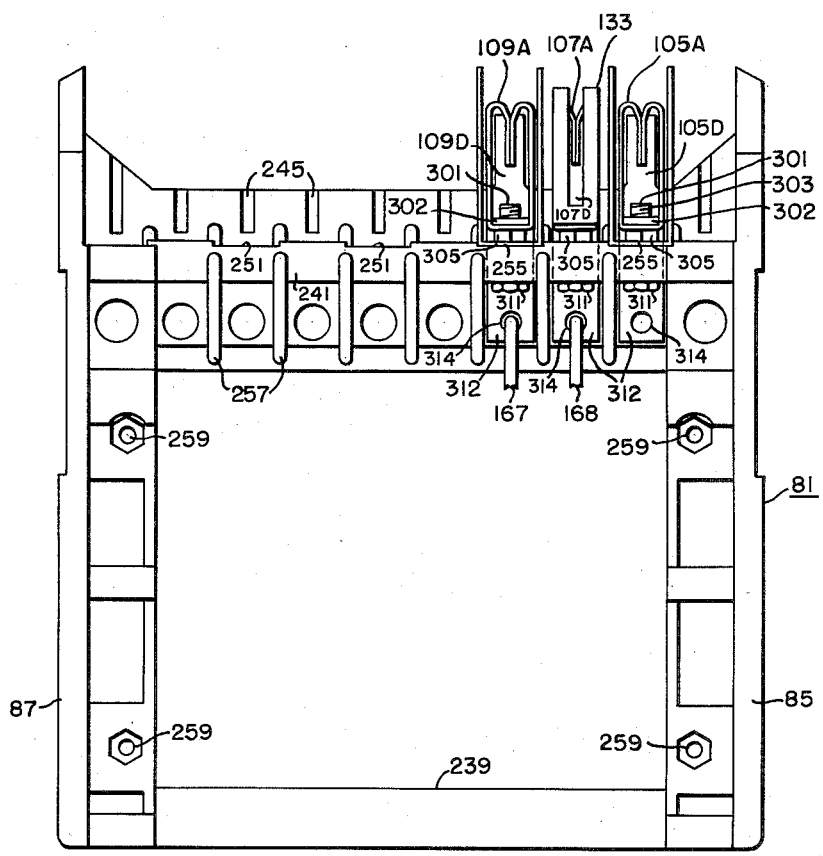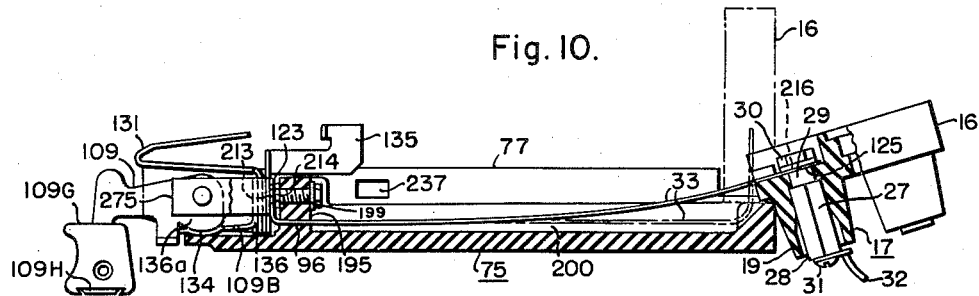

United States Patent Office 2,970,243
Patented Jan. 31, 1961

2,970,243

ELECTRICAL INSTRUMENT MOUNTING

Kolman Riesz, Gillette, and William E. Rich., Chatham, N.J., assignors to Westinghouse Electric Corporation, East Pittsburgh, Pa., a corporation of Pennsylvania Filed July 30, 1957, Ser. No. 675,191

15 Claims. (Cl. 317—99)

This invention relates to electrical apparatus and has particular relation to electrical apparatus including a structure for supporting an electrical device or instrument in operative position to permit ready withdrawal of the electrical device or instrument from operative position.

In the prior art, it has often been found convenient to mount an electrical device or instrument detachably on a supporting structure. Such mounting is particularly desirable for electrical devices or instruments such as integrating instruments, indicating instruments, recording instruments and relays which are flush mounted on a supporting structure such as a switchboard or panel. When an instrument is flush mounted on a switchboard or panel, the instrument movement is located substantially towards the rear of the switchboard or panel and consequently is in a position relatively inaccessible for inspection and servicing. For this reason, it is desirable to so mount the instrument that it may be removed readily for inspection and servicing. Examples of prior art detachable mountings for electrical instruments are shown in the West et al. Patent 2,286,044, the Smith et al. Patent 2,254,920 and the Chapman et al. Patent 2,388,675.

In the above-mentioned Chapman et al. patent a supporting structure is provided for a detachable electrical instrument. This supporting structure includes a casing having a detachable cover which is proportioned to receive an electrical instrument. In order to permit ready removal of the electrical instrument from the casing, switch means are provided including parts carried by the instrument and parts on the casing. By actuation of the switch means, conductors secured to casing and conductors secured to the instrument may be mechanically and electrically connected and disconnected. When the switch means is in disconnected condition, the electrical instrument may be removed readily from the associated casing.

According to the present invention the casing conductors are of improved configuration and arrangement so as to facilitate the assembly thereof to the casing. The casing and casing conductors are further designed to permit an improved manner of connection of the casing conductors to the casing switch parts and to terminals carried by the casing. The invention further provides improved connector means for facilitating and improving the connection of the instrument conductors to the instrument switch parts.

Preferably the switch means takes the form of a knife switch having a contact jaw positioned on one of the relatively movable parts, such as the instrument, and having a knife blade pivotally secured to the remaining part, such as the casing, for rotation into and out of engagement with the associated contact jaw when the instrument is in operative position within the casing.

If a plurality of separate switches are required these switches may have their knife blades connected for rotation as a unit into and out of engagement with their respective contact jaws. For maximum flexibility, however, the switches may be arranged for independent operation.

The invention provides further a frame or chassis of improved construction for housing the instrument. The chassis support improved latching means for securing the chassis to the casing. Some electrical instruments require operations to be effected from a position exterior to their casings. According to the invention improved means are provided for performing an operation upon the instrument from a position exterior to the casing associated with the instrument.

It is, therefore, an object of the invention to provide an improved electrical assembly including supporting means for detachably supporting an electrical instrument.

It is a further object of the invention to provide an improved electrical assembly including a supporting casing structure for detachably supporting an electrical instrument with switch means having parts on the supporting casing structure and parts on the electrical instrument for detachably connecting conductors positioned on the supporting structure and conductors positioned on the electrical instrument.

It is another object of the invention to provide an assembly as defined in the preceding paragraph wherein the casing structure and conductors positioned on the casing structure are of improved configuration and arrangement so as to facilitate the assembly of the conductors to the casing structure.

It is a still further object of the invention to provide an electrical assembly including a casing for detachably supporting an electrical instrument which is housed within a chassis of improved construction.

It is also an object of the invention to provide an improved electrical assembly including a supporting casing structure for detachably supporting an electrical instrument with improved means for performing an operation upon the instrument from a position exterior to the casing structure.

Other objects of the invention will be apparent from the following description taken in conjunction with the accompanying drawings, in which:

Figure 1 is a view in front perspective of a casing for an electrical instrument embodying the invention.

Figure 2:
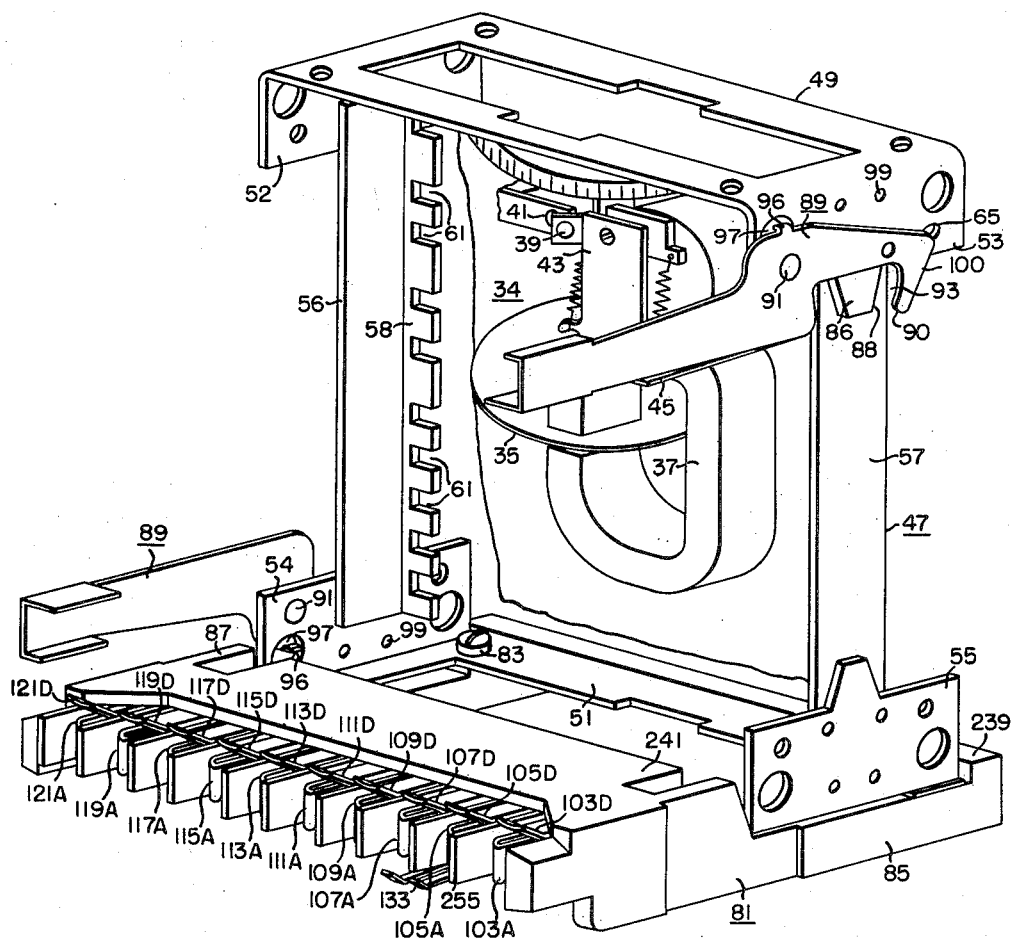
Figure 2A:
Figure 9:
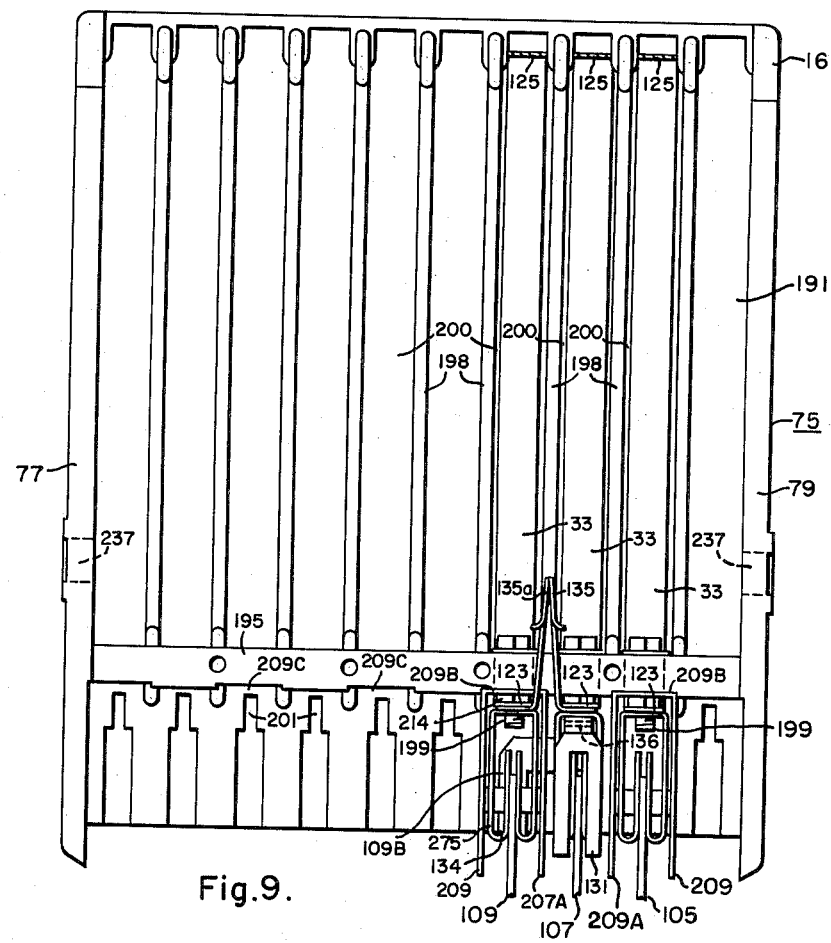
Figure 6:
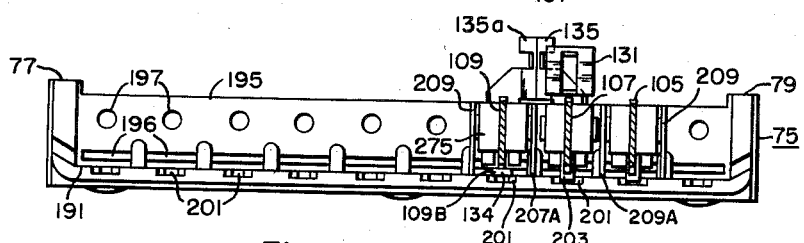

Fig. 2 is a view in front perspective with parts broken away of an electrical instrument suitable for insertion in the casing of Fig. 1, Fig. 2A is a view in top plan of a latching member associated with the instrument of Fig. 2, Fig. 3 is a view in rear elevation of a cover for positioning over the front of the casing of Fig. 1, Fig. 3A is a view in side elevation of a reset strap for performing a reset operation upon the instrument of Fig. 2, Fig. 4 is a view taken along the line IV—IV of Fig. 3, Fig. 5 is a detail view with parts in section showing switch assemblies employed in the instrument and casing assembly of Figs. 1 and 2, Fig. 6 is a view in front elevation of an insulating assembly including a base member and a terminal block suitable for the casing of Fig. 1 with electrical switches added, Fig. 7 is a view in bottom plan of an insulating member siutable for the electrical instrument of Fig. 2 with electrical switches added, Fig. 8 is a front view in elevation of the insulating member shown in Fig. 7, Fig. 9 is a view in top plan of the assembly of Fig. 6, and Fig. 10 is a detail view with parts in section showing the insulating assembly of Figs. 6 and 9 prior to assembly thereof.

Referring to the drawings, Fig. 1 shows a portion of a supporting structure in the form of a casing 1 which is formed of a continuous wall 3 having a back closure 5 secured thereto. The front of the casing 1 is provided with a flange 7 having openings 9 therein through which screws may be inserted for the purpose of attaching the casing to a suitable supporting member such as a panel or switchboard. The wall 3, the back closure 5 and the front flange 7 may be secured to each other in any suitable manner such as by welding. These parts, however, are preferably integrally connected to provide a casing 1 of integral construction.

In order to connect conductors 33 (Figs. 5 and 10) positioned within the casing 1 to conductors located outside of the casing 1, the present invention provides a terminal block 16 which may be formed of an insulating material such as a phenolic resin. The block 16 is secured to the back closure 5 of the casing to support a plurality of terminals 17 illustrated in Fig. 10.

As shown in Fig. 10, the terminal 17 includes a bushing 19 which forms an integral part of the block 16. The bushing 19 projects from the rear of the block 16 through an opening (not shown) in the back closure of the casing when the block 16 is operatively positioned within the casing. A conductive member 27 having internal threads at its outer end 28 passes through an enlarged circular opening and a communicating restricted hexagonal opening of the bushing 19. The outer end 28 of the member 27 is provided with a hexagonal cross section to interfit with the hexagonal opening of the bushing 19. The inner end 29 of the member 27 extends into the casing enclosure and is provided with threads to receive a connecting nut 30 for connecting a conductor 33 located within the casing to the member 27. An external conductor 32 may be connected to the member 27 at the outer end 28 by means of a machine screw 31 which threadably engages the member 27. In this manner conductors 33 positioned within the casing may be connected to power sources such as current and voltage tranformers located externally of the casing.

The casing of Fig. 1 is proportioned to receive an electrical instrument of any suitable type such as that illustrated in Fig. 2. The specific instrument selected for the purpose of illustration is a conventional electrical relay represented generally by the numeral 34. To assist in orienting the relay which is of the induction type, attention may be directed to the induction disk armature 35 which rotates in the air gap of a damping magnet 37. The shaft on which the armature 35 is mounted carries a movable electrical contact 39 which is rotatably carried by the armature into engagement with a fixed electrical contact 41 to complete a control circuit when the relay is suitably energized. An operation indicator 43 having a resetting plate 45 also is illustrated.

In Fig. 2, the electrical relay 34 is secured within a suitable frame or chassis 47. Although the chassis may completely enclose the relay, if desired, a complete enclosure generally is not required for the reason that the relay is intended to be enclosed within the casing 1 of Fig. 1.

According to the present invention a skeleton frame or chassis 47 is provided which includes a pair of frame end pieces 49 and 51 of generally rectanguar configuration having respectively depending terminal parts 52, 53 and 54, 55. These end pieces are connected by a pair of connecting strips 56 and 57 which are secured respectively to the terminal parts 52, 54 and the parts 53, 55. Each of the strips 56 and 57 includes an integral angle piece 58 with the angle pieces of the two strips projecting toward each other in a common plane. Each of these angle pieces has a plurality of notches 51 for receiving machine screws (not shown) which pass through openings in the structure of the relay 34. Suitable nuts (not shown) may be secured to the threaded ends of the screws for attaching the relay to the angle pieces and thereby to the chassis 47. The parts of the chassis may be formed of a metal such as steel and may be secured to each other in any siutable manner as by spot welding to form a rigid and sturdy structure.

To facilitate insertion and removal of the relay 34 with respect to the casing 1, it is desirable that the casing and the relay be provided with cooperating rails or guide surfaces. To this end the casing of Fig. 1 is provided with an insulating assembly including a base member 75 (see Figs. 1, 6 and 9) having a pair of projecting ribs 77 and 79 which are located adjacent opposite sides of the casing 1. These ribs 77 and 79 may be termed rails or guide surfaces for guiding the relay 34 into and out of operative position with respect to the casing 1.

In a somewhat analogous manner, an insulating member 81 (see Figs. 2, 7 and 8) is secured to the chassis 47 (Fig. 2) in any suitable manner as by machine screws 83 which pass through openings in the end piece 51 and which are received by threaded nuts held captive in openings of the insulating member 81. The insulating member 81 has ribs 85 and 87 projecting therefrom to provide rails or guide surfaces cooperating with the rails 77 and 79 of the base insulating member 75.

In the present invention the chassis is secured to the casing by means of latches 89 which are pivotally secured to the terminal parts 53 and 54 by means of rivets 91. Each of the terminal parts 53 and 54 by means of rivets 91. Each of the terminal parts 53 and 54 includes a projection with the projection 86 of the part 53 only being shown. These projections are of tapered configuration having surfaces 88 which define with surfaces 90 of the latches notches 93 for receiving pins 95 projecting inwardly from the wall 3 of the casing 1 (Fig. 1).

This arrangement facilitates the latching operation inasmuch as the surfaces 88 serve as stops to engage the pins 95 when the relay is properly positioned in the casing. Angular movement of the latches is limited by travel of integral stops 96 of the latches within openings 97 formed in the parts 53 and 54.

In order to positively retain the latches in latching and unlatching positions the latches are provided with projections 98 (Fig. 2A) which engage openings 99 of the parts 53 and 54 when the latches are in the unlatching position, and openings (not shown) of the parts 53 and 54 when the latches are in the latched position as illustrated in Fig. 2. The latches are provided with sloping surfaces 100 over which the pins 95 move during entry of the chassis into the casing to position the latches for the latching operation.

In order to connect the windings and contacts of the relay 34 to the terminals 17 of the casing 1, a plurality of switches is provided which includes parts on the insulating member 75 (Fig. 1) and parts on the insulating member 81 (Fig. 2). Because of their proved reliability, knife switches are employed for establishing the desired connections. To this end a plurality of knife blades 103, 105, 107, 109, 111, 113, 115, 117, 119 and 121 are pivotally secured to the base insulating member 75. Each of the knife blades is provided with a cooperating contact jaw mounted on the insulating member 81 for movement with the relay 34 relative to the casing 1. Each contact jaw is identified by the reference character of its cooperating knife blade to which the letter A has been affixed.

By inspection of Figs. 1, 2 and 5, it will be observed that when the relay 34 is in operative position within the casing 1, each of the knife blades may be actuated into engagement with its associated contact jaw. Before the relay can be removed from its operative position, the knife blades must be actuated away from the associated contact jaws. If desired, the knife blades may be proportioned as shown to have portions in the path of attachment of the cover 13 when the knife blades are in open positions. Such a construction permits attachment of the cover only when the switch blades are in closed positions.

Each of the windings and contacts of the relay 34 is connected to one or more of the associated contact jaws. Therefore, closure of the associated knife blades establishes an electrical connection between the windings and contacts of the electrical relay and the conductors 33 carried by the casing 1. Although ten knife switches are illustrated in Figs. 1 and 2, it will be understood that the number of switches actually required depends on the particular relay or other instrument positioned within the chassis 47.

According to the invention the casing conductors 33 are configured and arranged to facilitate assembly and connection thereof to the knife blades and terminal block 16. As best shown in Figs. 5 and 9 the conductors 33 are in the form of elongated straps each having a pair of terminals 123 and 125. These straps are formed of an electro-conductive material such as copper, and are positioned in side-by-side relation substantially in a common plane throughout substantially the entire lengths of the straps. This arrangement provides a very compact and neat appearing structure. The method of assembly of the straps to the member 75 and the block 16 will be described hereinafter.

The instrument supported in the chassis 47 may include an operating winding such as a current winding (not shown) forming part of a current circuit energizable through the knife switches from a current transformer (not shown). Portions of this current circuit are shown in Fig. 7 in the form of conductors 167 and 168 connected respectively to the contact jaws 109A and 107A in a manner described hereinafter.

If such a current circuit is employed it is desirable that means be provided for testing the current therein. For this purpose a jack is provided which includes a resilient blade 131 secured to the base insulating member 75 (Fig. 1) and a resilient blade 133 secured to the insulating member 81 (Fig. 2). These blades are so positioned that when the relay 34 is in operative position, the resilient blades 133 and 131 are in engagement. Therefore, if a current circuit is completed through these blades, a jack plug may be inserted therebetween for the purpose of connecting a current responsive instrument such as an ammeter in the current circuit.

It will be observed that the resilient blades 131 and 133 are slotted to permit passage of the knife blade 107 into engagement with its associated contact jaw. In this engaged position of the knife blade 107 the knife blade establishes a circuit in parallel with the jack represented by the resilient blades 131 and 133. Consequently, under most operating conditions the reliable contact of the knife switch is relied on rather than the contact between the resilient blades 131 and 133 of the jack. It should be observed further that the switch knife blade 107 must be opened before a jack plug can be inserted effectively between the resilient blades 131 and 133. Such opening of the knife switch blade is required to open the parallel circuit established thereby across a jack represented by the resilient blades 131 and 133.

If the instrument supported by the chassis 47 and the casing 1 is energized in part from a current transformer, it is desirable that removal of the instrument should not open the circuit energized by the current transformer. To this end, one of the switches, such as that comprising the switch blade 109 and the contact jaw 109A which is employed for completing the circuit across the secondary winding of the current transformer, is provided with a back contact 109B (Figs. 5, 6 and 9) which is engaged by a portion of the knife blade 109 as the knife blade is moved out of engagement with its associated contact jaw 109A. Engagement of the knife blade 109 with its back contact 109B is employed for maintaining a circuit across the secondary winding of the associated current transformer.

The back contact 109B is conveniently in the form of an integral plate constructed of a suitable resilient electro-conductive material. The plate 109B is supported by the insulating member 75 and includes a terminal part 134 located directly beneath the support for the blade 109. The other terminal part 136 of the plate 109B is secured to the support for the blade 107. The part 134 is spaced from the member 75 when in an unbiased condition so as to be engageable with a portion 136a of the blade 109 when the blade 109 is rotated to its open position. Further details of the construction and assembly of the plate 109B are described in application Serial No. 657,074, filed July 30, 1957 which is now identified as Patent 2,942,156, and which is assigned to the same assignee.

If the chassis 47 and the instrument supported thereby are removed from the casing 1, there is a possibility that the switch knife blade 109 may be actuated out of engagement with its back contact 109B to open the circuit across the secondary of the associated current transformer. To prevent such opening, an auxiliary switch is provided including a pair of resilient spring leafs 135 and 135a which are biased into engagement when the instrument is removed from the casing. These leafs are connected respectively to the knife blade 107 and the knife blade 109. The resilient spring leafs project into the path of movement of the insulating member 81 as the chassis is inserted in the casing 1 such that a portion 257 of the member 81 is passed between the leafs to disengage contacts carried by the leafs as shown in Fig. 5. Consequently, under normal operating conditions of the relay 34, the contacts carried by the spring leafs 135 and 135a are separated. When the relay 34 and its chassis 47 are removed from the casing 1, the spring leafs 135 and 135a are biased towards each other such that the contacts carried thereby are in engagement to establish a circuit across the secondary of the associated current transformer.

To facilitate testing of the electrical circuits associated with the relay, it is desirable that each of the contact jaws of the knife switches be provided with a suitable terminal. As shown in Fig. 2, each of the contact jaws may be provided with a terminal strip which is identified by the reference character applied to the associated knife blade to which the letter D is added.

According to the present invention these terminal strips also serve to connect circuit conductors of the relay 34 to the associated contact jaws. Details of the construction and connection of these terminal strips will be described hereinafter.

Some electrical instruments require operations to be effected from a position exterior to their casings. For example, in Fig. 2 the operation indicator 43 may require resetting from the exterior of the associated casing.

According to the present invention such resetting may be effected by means of an integral resetting strap 180 shown in Figs. 3 and 3A. The strap 180 includes an end portion 181 which projects through a slot of the cover 13 illustrated in Fig. 3. The strap 180 is guided for vertical movement by a pair of spaced guide means 182 which are integrally secured to the cover 13. As shown in Fig. 3 the strap has a portion 183 bent to underlie the resetting plate 45 of the operation indicator. Consequently, operation of the end portion 181 in an upward direction raises the resetting plate 45 to reset the associated operation indicator.

As shown in Figs. 3 and 4 each of the guide means 182 includes projections 184 and 185 of the cover which define a channel 186 for receiving the strap 180. The strap 180 is operatively retained within the channel 186 by means of a retaining plate 187 which is secured to the guide means by means of a screw 188 which passes through openings of the plate 187 and projection 184. The plate 187 further includes a pair of openings 189 for receiving tabs 190 which extend from the projections 185. The strap 180 has additionally a struck out portion 180a which serves as a stop to limit vertical movement of the strap by engaging the lower one of the guide means as viewed in Fig. 3. It is noted that the strap 180 is formed with notches 192 which may serve to retain a dust-proofing washer 193 for the cover in position.

The base insulating member 75 (Fig. 1) may be constructed in various ways. As shown in Figs. 6 and 9 more clearly the base insulating member 75 may have a base 191 from which the rails 77 and 79 project. A wall 195 extends between the rails 77 and 79 to connect the rails 77 and 79. The wall 195 has openings 197 through which bolts 199 may extend for the purpose of connecting thereto the switch knife blades, three of which are illustrated in Figs. 6 and 9. The wall 195 is provided with a plurality of slots 196 for receiving the conductors 33 as will presently appear. The base 191 is formed with a plurality of ribs 198 providing spaced channels 200 for receiving the conductors 33. To retain the switch knife blades more firmly in desired positions, the base insulating member may be provided with slots 201 which receive tongues 203 of the pivot supports 275 (Fig. 5) for the switch knife blades.

It is desirable that insulating partitions extend also between the switch knife blades. Such partions may be molded together with the remainder of the base insulating member integrally from a suitable insulating material such as a phenolic resin. In the specific embodiment illustrated in Fig. 9 U-shaped barriers 209 are secured to the wall 195 by the bolts which secure the switch knife blades thereto. These barriers are formed of a suitable insulating material such as nylon and have arms 207A and 209A extended between adjacent switch knife blades. The barriers have webs 209B positioned in slots 209C formed in the wall 195. These webs have openings aligned with the openings 197 to permit attachment of the barriers to the wall by means of bolts passing through the aligned openings. Suitable openings 237 may be provided in the rails 77 and 79 for permitting passage of machine screws 217 (Fig. 1) which extend through openings 218 of the casing for attaching the base insulating member to the casing.

The insulating member 81 is illustrated more fully in Figs. 7 and 8. This insulating member includes a top wall 239 to which the rails 85 and 87 are attached. The insulating member 81 also carries a wall 241 which extends between the rails 87 and 85. This wall contains openings 243 which permit passage of bolts 303 employed for attaching the contact jaws such as the contact jaw 105A thereto.

Conveniently, the member 81 is provided with slots 245 designed for reception of tongues 247 (Fig. 5) of the contact jaws to prevent rotation of the contact jaws. The wall 241 also is provided with notches 251 for reception of U-shaped barriers 255. These barriers correspond to the barriers 209 of Fig. 9 and may be secured to the wall 241 in a similar manner by the screws employed for attaching the contact jaws to the wall 241.

Partitions 257 project rearwardly from the wall 241 to space conductors which are to be connected to the contact jaws mounted on the wall 241. Conveniently, one of the partitions 257 may serve to space the spring leafs 135 and 135a when the chassis 47 is inserted in the casing. A plurality of openings 259 may be provided in the insulating member 81 for reception of the machine screws 83 (Fig. 2) and captive nuts (not shown) which are employed for attaching the insulating member to the chassis 47.

The construction and mounting of the switches on their cooperating insulating members is illustrated in Fig. 5 which is a sectional view through portions of the insulating members 75 and 81 with parts broken away to show primarily the switch blade 109 and associated parts of the switching mechanism. In Fig. 5 the switch 109 is illustrated as pivotally mounted on a forked support 275.

The knife blade 109 may have a head 109G of suitable insulating material which may be molded thereon. Conveniently, the head may have a notch provided therein for the reception of a suitably colored or otherwise identified label 109H. The label may be cemented or otherwise secured to the head.

It will be recalled that the contact jaws are provided with a plurality of terminal strips. Each of these strips has the configuration of the strip 109D shown in Fig. 5. As there shown the terminal strip 109D has a depending struck down portion 302 with a threaded opening for reception of a threaded end 301 of a bolt 303 (see Fig. 7). The bolt has a hexagonal head 305 intermediate the threaded end 301 and the main threaded portion of the bolt. Between the portion 302 of the terminal strip 109D and the hexagonal head 305, the resilient blade 133 and the contact jaw 109A are firmly clamped. The blade 133 and the contact jaw 109A have openings permitting passage of the threaded end 301 therethrough into threaded engagement with the poriton 302 of the terminal strip 109D. Both the blade 133 and the contact jaw 109A may have extensions or tongues 307 and 247 for engaging one of the slots 245 provided in the insulating member 81. These tongues prevent rotation of the blade 133 and the contact jaw 109A with respect to the insulating member 81. The bolt 303 is secured to the wall 241 of the insulating member 81 in any suitable manner as by means of a nut 311.

According to the present invention the terminal strips for the contact jaws are employed to connect conductors of the relay 34 to the associated contact jaws. To this end each of the terminal strips includes an integral terminal portion which projects through a slot of the wall 241 of the member 81. As shown in Figs. 5 and 7 the strip 109D includes a terminal portion 312 which extends through a slot 313 of the wall 241. The portion 312 has an opening 314 into which projects a bare end of the conductor 167 of the relay 34. The conductor 168 of the relay is also shown connected to its contact jaw 107A by means of a terminal strip 107D. With this arrangement the conductors 167 and 168 are connected or disconnected to the associated straps 33 by operation of the knife blades 107 and 109. The associated straps 33 may be connected to the secondary of a current transformer (not shown) through the conductor 32.

As previously explained, the back contact 109B includes a part 134 associated with the switch blade 109. As best shown in Fig. 9 this back contact is attached to the insulating member 75 by means of the bolt 199 associated with the switch blade 107 which has a threaded end threadedly received in a threaded opening provided in the terminal part 136 of the back contact 109B. This bolt also serves to support the spring leaf 135. By inspection of Figs. 5 and 7 it will be observed that the bolt 199 associated with the switch blade 107 serves to electroconductively connect the spring leaf 135, the blade 131 and the back contact 109B.

The manner of assembly of the casing conductor straps 33 to the insulating member 75 and terminal block 16 is best illustrated in Fig. 10. As there shown, each of the terminals 123 of the straps is formed with an opening 213. The straps are initially positioned to extend through the slots 196 of the wall 195 with the terminals 123 in engagement with nuts 214 placed in threaded engagement with ends of the bolts 199 which project through the openings 213. The portions of the straps intermediate the terminals 123 and 125 are located within the channels 200.

In order to facilitate securement of the terminals 125 to the block 16, the block 16 is initially positioned relative to the member 75 substantially as shown in Fig. 10. With such positioning openings 216 formed in the terminals 125 of the straps are readily passed over the ends 29 of the conductive members 27. The nuts 30 may then be applied to the ends 29 of the members 27 to secure the terminals 125 to the members 27.

In order to permit positioning of the member 75, the block 16 and the straps 33 connected thereto within the casing 1, relative movement between the member 75 and the block 16 is effected to displace these parts from the positions shown in full lines in Fig. 10 to the transverse positions thereof illustrated by the broken lines in Fig. 10. The entire assembly including the member 75, the block 16 and the straps 33 may then be readily positioned within the casing 1 with the bushings 19 extending through openings (not shown) in the back closure of the casing. Screws 217 (Fig. 1) are then passed through openings 218 of the casing to threadably engage nuts held captive in openings of the rails 77 and 79 for securing the member 75 to the casing. In a similar manner screws and captive nuts may be employed to secure the block 16 to the casing.

Although the invention has been described with reference to certain specific embodiments thereof, numerous modifications are possible and it is desired to cover all modifications falling within the spirit and scope of the invention.

We claim as our invention:

1. In an electrical instrument assembly, a supporting structure, electrical contact means mounted on and secured to said supporting structure, an electrical instrument supported in operative position by said supporting structure, said electrical instrument being movable from said operative position to a position displaced therefrom, and electrical contact means positioned on said electrical instrument and movable therewith between said positions, a first one of said electrical contact means comprising means operable with said electrical instrument in its operative position into and out of engagement with a second one of said electrical contact means, said instrument including a circuit conductor, said instrument contact means including an integral electro-conductive terminal element having a pair of spaced end portions and a portion intermediate the end portions extending at an angle relative to a line connecting the end portions, one of said end portions engaging said circuit conductor, the other of said end portions being accessible externally of said instrument assembly when said instrument is in operative position for connecting said circuit conductor to an external circuit, and the intermediate portion being secured to said electrical instrument for movement therewith.

2. In an electrical assembly, a casing having an opening, a chassis positioned within said casing for movement relative thereto from an operative position through said opening to a position displaced therefrom, said chassis including a pair of end pieces each having a central section spacing a pair of integral terminal parts extending transverse to said central section, and a pair of horizontally spaced vertically extending brackets supporting said end pieces with said central sections in parallel vertically spaced planes to have the pairs of terminal parts extending vertically towards each other; said end pieces and brackets providing an enclosure, an electrical instrument detachably mounted by said chassis for movement therewith substantially within said enclosure, and releasable latch means supported by at least one of said end pieces for securing said instrument to said casing.

3. In an electrical assembly, a casing having an opening, a chassis positioned within said casing for movement relative thereto from an operative position through said opening to a position displaced therefrom, an electrical instrument detachably mounted by said chassis within said casing for movement with the chassis, and latch means for securing said instrument to said casing within said opening, said latch means including a latch mounted by said chassis for pivotal movement about an axis between latching and unlatching positions, said casing including a projection within said opening extending substantially parallel to said axis, said latch including a hook-shaped latching end providing a latching surface for latchingly engaging said projection, said chassis including a stop element having a stop surface defining with said latching surface a notch for receiving said projection when the latch is pivoted to its latching position, said stop surface being located to engage said projection in response to movement of said chassis into said casing when said latch is in its unlatched position.

4. In an electrical assembly, a casing having an opening, a chassis positioned within said casing for movement relative thereto from an operative position through said opening to a position displaced therefrom, an electrical instrument detachably mounted by said chassis within said casing for movement with the chassis, and latch means for securing said instrument to said casing within said opening, said latch means including a latch mounted by said chassis for pivotal movement about an axis between latching and unlatching positions, said casing including a projection within said opening extending substantially parallel to said axis, said latch including a hook-shaped latching end providing a latching surface for latchingly engaging said projection, said chassis including a stop element having a stop surface defining with said latching surface a notch for receiving said projection when the latch is pivoted to its latching position, said stop surface being located to engage said projection in response to movement of said chassis into said casing when said latch is in its unlatched position, said chassis and latch having parts arranged for interfitting engagement at each of said latching and unlatching positions to releasably retain the latch in either of said positions.

5. In an electrical assembly, a casing having an opening, a chassis positioned within said casing for movement relative thereto from an operative position through said opening to a position displaced therefrom, an electrical instrument detachably mounted by said chassis within said casing for movement with the chassis, and latch means for securing said instrument to said casing within said opening, said latch means including a latch mounted by said chassis for pivotal movement about an axis between latching and unlatching positions, said casing including a projection within said opening extending substantially parallel to said axis, said latch including a hook-shaped latching end providing a latching surface for latchingly engaging said projection, said chassis including a stop element having a stop surface defining with said latching surface a notch for receiving said projection when the latch is pivoted to its latching position, said stop surface being located to engage said projection in response to movement of said chassis into said casing when said latch is in its unlatched position, said chassis and latch having cooperating limit means engageable in response to pivotal movement of said latch for limiting such pivotal movement to a preselected angle.

6. In an electrical assembly, a first insulating member, a second insulating member engaging said first member for sliding movement with respect thereto from an operative position to a position displaced therefrom, said first and second members having respectively first and second wall portions extending transverse to the plane of sliding engagement of said members, an electrical instrument detachably supported by said second member at one side of said second wall portion for movement with said second member, first electrical contact means mounted on said second wall portion at the other side thereof, second electrical contact means mounted on said first wall portion at the side thereof corresponding to said other side of the second wall portion, one of said first and second contact means comprising means operable with said instrument in its operative position into and out of engagement with the other of said first and second contact means, said instrument including a circuit conductor, said first contact means including an integral electroconductive terminal element having a pair of spaced end portions, said second wall portion having an opening through which said terminal element extends freely with each of said end portions located at a separate side of said second wall portion, the one end portion located at said one side of said second wall portion engaging said circuit conductor, the other end portion located at said other side of said second wall portion being accessible externally of said instrument assembly when said instrument is in operative position for connecting said circuit conductor to an external circuit, said terminal element having an intermediate portion parallel to and adjacent the second wall portion, the intermediate portion being secured to the second wall portion by means spaced from said opening.

7. In an electrical assembly, an insulating structure including a base portion and a pair of spaced wall portions extending transverse to the base portion at opposing ends thereof, a plurality of contact elements carried by one of said wall portions in spaced relation along said one of said wall portions, a plurality of terminal means carried by the other of said wall portions in spaced relation, and bare conductor means connecting said contact elements to said terminal means, said base portion including a plurality of insulating partitions spaced in the direction of spacing of the contact elements, said partitions extending between said wall portions to provide a plurality of troughs each containing a separate conductor.

8. In an electrical assembly, an insulating member including a base portion having a pair of spaced ends, a plurality of contact elements supported by said insulating member spaced in a first direction substantially transverse to the direction of spacing of said ends, a plurality of terminals supported in spaced relation by said insulating member spaced from said contact elements in the direction of spacing of said ends, and conductor means connecting said contact elements to said terminals, said conductor means comprising a plurality of flexible electroconductive bare strips each having a pair of end terminals spaced by an intermediate flat strip portion extending substantially transverse to the end terminals, each strip having its end terminals connected respectively to a contact element and a terminal, said strip portions extending in the direction of spacing of said ends spaced in said first direction, said base portion including a plurality of insulating partitions spaced in said first direction to provide a plurality of troughs each containing a separate one of said conductors.

9. In an electrical assembly, an insulating member including a base portion and a wall portion extending transverse to the base portion at one end thereof, an insulating terminal block detachably supported by said insulating member at the other end of the base portion in a plane parallel to said wall portion, a plurality of contact elements carried by said wall portion in spaced relation along the wall portion, a plurality of terminal means carried by said terminal block in spaced relation, and a plurality of bare conductors connecting said contact elements to said terminal means, said base portion including a plurality of insulating first partitions spaced in the direction of spacing of the contact elements, said first partitions extending between the ends of the base portion to provide a plurality of first troughs each containing a separate conductor, said terminal block including a plurality of spaced insulating second partitions providing a plurality of second troughs communicating with the first troughs, said second troughs containing terminal portions of said conductors which lead to said terminal means.

10. In an electrical assembly, an insulating member including a base portion and a wall portion extending transverse to the base portion, said wall portion having a slot extending therethrough, a contact element carried by said wall portion on one side of the wall portion, a terminal carried by said insulating member at the other side of the wall portion spaced from said contact element, and conductor means connecting said contact element to said terminal, said conductor means comprising a flexible electroconductive flat ribbon having a pair of end terminals spaced by an intermediate flat strip portion extending substantially transverse to the end terminals, said ribbon having its end terminals connected respectively to the contact element and the terminal by means spaced from said slot, said ribbon extending through said slot with its end terminals on opposing sides of the wall portion in engagement respectively with said contact element and said terminal.

11. In an electrical assembly, a first insulating member, a second insulating member engaging said first member for sliding movement with respect thereto from an operative position to a position displaced therefrom, said first and second members having respectively first and second wall portions extending transverse to the plane of sliding engagement of said members, an electrical instrument detachably supported by said second member at one side of said second wall portion for movement with said second member, a contact jaw mounted on said second wall portion at the other side thereof, a contact blade pivotally mounted on said first wall portion at the side thereof corresponding to said other side of the second wall portion, said blade being operable with said instrument in its operative position into and out of engagement with the jaw, said instrument including a circuit conductor, an electroconductive terminal element having a first section with a pair of spaced end portions, and a second section integrally attached to the first section, said second wall portion having an opening through which said first section extends freely with each of said end portions located at a separate side of said second wall portion, the one end portion located at said one side of said second wall portion engaging said circuit conductor, the other end portion located at said other side of said second wall portion being accessible externally of said instrument assembly when said instrument is in operative position for connecting said circuit conductor to an external circuit, said second section being in engagement with said jaw in an area displaced substantially from the first section in a direction parallel to said second wall portion.

12. In an electrical assembly, a first insulating member, a second insulating member engaging said first insulating member for sliding movement with respect thereto from an operative position to a position displaced therefrom, said first member including a wall portion transverse to the plane of sliding movement, said wall portion having an opening, a separate electrical circuit element secured to each of said insulating members, switch means including first and second contact elements for detachably connecting said circuit elements, means mounting said first contact element on said second insulating member, said second contact element being pivotally mounted at a position spaced from said opening on said wall portion on one side thereof for rotation relative thereto into and out of engagement with said first contact element when said second insulating member is in operative position, and means connecting each of said circuit elements to a separate one of said contact elements, said last-named means including a flat, flexible electroconductive strip having a pair of end terminal spaced by an intermediate flat strip portion, said strip being supported by said first insulating member to extend through said opening with said end terminals on opposing sides of the wall portion in engagement respectively with said second contact element and the circuit element secured to said first insulating member, said flat strip portion lying substantially on the other side of the wall portion in a plane substantially parallel to the plane of sliding engagement of said first and second insulating members.

13. In an electrical assembly, an insulating member including a base portion having a pair of ends, an insulating terminal block detachably supported by said insulating member at one of said ends in a plane extending transverse to said base portion, a contact element supported by said insulating member, a terminal carried by said block spaced from said base portion and also spaced from said contact element substantially in the direction of spacing of said ends, and a flexible electrical conductor having a pair of terminal portions spaced by an intermediate conductor portion, said terminal portions being connected respectively to said contact element and said terminal, the terminal portion of said conductor which is connected to said terminal extending substantially transverse to the intermediate portion when the block is in its transverse position, said block being movable relative to the insulating member between its transverse position and a second position displaced from the transverse position wherein the plane of the block and the base portion define an angle greater than a right angle.

14. In an electrical assembly, an insulating member including a base portion having a pair of ends, an insulating terminal block detachably supported by said insulating member at one of said ends in a plane extending transverse to said base portion, a contact element supported by said insulating member, a terminal carried by said block spaced from said base portion and also spaced from said contact element substantially in the direction of spacing of said ends, and a flexible conductor strip having a pair of terminal portions spaced by an intermediate flat strip portion, said terminal portions being connected respectively to said contact element and said terminal, the terminal portion of said conductor which is connected to said terminal extending substantially transverse to the intermediate portion when the block is in its transverse position, said block being movable relative to the insulating member between its transverse position and a second position displaced from the transverse position wherein the plane of the block and the base portion define an angle greater than a right angle.

15. In an electrical assembly, an insulating structure including a pair of walls spaced by a base portion extending transverse to said walls, a plurality of contact elements, separate securing means securing each of said contact elements to one of said walls with the contact elements spaced along the wall, a plurality of terminals secured to the other of said walls in spaced relation, each of said contact elements and terminals having a connection surface extending substantially transverse to the base for receiving an electrical connection, and conductor means connecting said contact elements to said terminals, said conductor means comprising a plurality of flexible electroconductive strips each having first and second end terminals spaced by an intermediate flat strip portion extending substantially transverse to the end terminals, each of said securing means securing a separate one of said first end terminals to said one wall in electrical contact with the connection surfaces of the associated contact elements, each of said second end terminals being secured to a separate one of the connection surfaces of said terminals, said intermediate strip portions being freely suspended between said secured end terminals.

References Cited in the file of this patent

UNITED STATES PATENTS

| | | |
|---|---|---|
| 2,227,967 | Favre | Jan. 7, 1941 |
| 2,388,675 | Chapman | Nov. 13, 1945 |
| 2,530,945 | Chapman | Nov. 21, 1950 |
| 2,802,972 | Warrington | Aug. 13, 1957 |